United States Patent
Won et al.

(10) Patent No.: US 10,694,356 B2
(45) Date of Patent: Jun. 23, 2020

(54) MECHANISM TO AUTOMATICALLY MANAGE INPUT AND OUTPUT ACROSS CONNECTED WEARABLE DEVICES

(71) Applicant: Samsung Electronics Co., Ltd., Suwon-si, Gyeonggi-do (KR)

(72) Inventors: Sungjoon Won, Seongnam-si (KR); James Powderly, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/366,360

(22) Filed: Mar. 27, 2019

(65) Prior Publication Data

US 2019/0222990 A1 Jul. 18, 2019

Related U.S. Application Data

(63) Continuation of application No. 15/592,848, filed on May 11, 2017, now Pat. No. 10,278,042, which is a
(Continued)

(30) Foreign Application Priority Data

Apr. 11, 2014 (KR) ........................ 10-2014-0043806

(51) Int. Cl.
*H04W 4/70* (2018.01)
*H04W 4/80* (2018.01)
(Continued)

(52) U.S. Cl.
CPC .............. *H04W 4/70* (2018.02); *G06F 1/163* (2013.01); *H04B 1/385* (2013.01); *H04Q 9/00* (2013.01);
(Continued)

(58) Field of Classification Search
CPC ......... H04W 4/005; H04W 8/22; H04W 8/18; H04W 4/02; H04W 4/008; H04B 1/385
(Continued)

(56) References Cited

U.S. PATENT DOCUMENTS

2004/0113771 A1 6/2004 Ozaki et al.
2004/0187553 A1 9/2004 Moriya et al.
(Continued)

FOREIGN PATENT DOCUMENTS

EP 2280512 A1 2/2011

OTHER PUBLICATIONS

European Office Action dated Jul. 26, 2017, issued in a counterpart European application No. 15163359.1-1954.
(Continued)

*Primary Examiner* — Congvan Tran
(74) *Attorney, Agent, or Firm* — Jefferson IP Law, LLP

(57) ABSTRACT

A method of selecting an external electronic device connected with an electronic device is provided. The method determining, among the plurality of external electronic devices, at least one external electronic device connected with the electronic device, transmitting signals to the at least one external electronic device, receiving data corresponding to the signals from the at least one external electronic device, selecting one of the at least one external electronic device based on the received data and transmitting an operation execution signal for the data to the selected external electronic device. A method of selecting an external electronic device connected with electronic device is provided. The method includes receiving a signal from the electronic device, transmitting data corresponding to the signal to the electronic device, receiving an operation execution signal
(Continued)

for the data from the electronic device and performing at least one of various operations according to the operation execution signal.

18 Claims, 8 Drawing Sheets

Related U.S. Application Data continuation of application No. 14/683,712, filed on Apr. 10, 2015, now Pat. No. 9,794,728.

(51) Int. Cl.

| | |
|---|---|
| *G06F 1/16* | (2006.01) |
| *H04W 52/02* | (2009.01) |
| *H04B 1/3827* | (2015.01) |
| *H04Q 9/00* | (2006.01) |
| *H04W 8/18* | (2009.01) |
| *H04W 8/22* | (2009.01) |
| *H04W 76/14* | (2018.01) |

(52) U.S. Cl.
CPC ............. *H04W 4/80* (2018.02); *H04W 8/18* (2013.01); *H04W 8/22* (2013.01); *H04W 52/0258* (2013.01); *H04Q 2209/43* (2013.01); *H04W 76/14* (2018.02); *Y02D 70/00* (2018.01); *Y02D 70/1222* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/26* (2018.01)

(58) Field of Classification Search
USPC .... 455/418, 9, 41.1, 41.2, 41.4, 456.6, 3.04; 715/740, 736
See application file for complete search history.

(56) References Cited

U.S. PATENT DOCUMENTS

| | | |
|---|---|---|
| 2011/0004670 A1 | 1/2011 | Mishra et al. |
| 2011/0275316 A1 | 11/2011 | Suumaki et al. |
| 2012/0220316 A1 | 8/2012 | Jang et al. |
| 2012/0310391 A1* | 12/2012 | Sanders ................. G06F 3/011 700/94 |
| 2013/0044215 A1 | 2/2013 | Rothkopf et al. |
| 2013/0046847 A1 | 2/2013 | Zavesky et al. |
| 2013/0072765 A1 | 3/2013 | Kahn et al. |
| 2013/0322496 A1 | 12/2013 | Park et al. |
| 2013/0326790 A1 | 12/2013 | Cauwels et al. |
| 2014/0031703 A1 | 1/2014 | Rayner et al. |
| 2014/0181683 A1 | 6/2014 | Lim et al. |
| 2014/0188985 A1 | 7/2014 | Park et al. |
| 2014/0218184 A1 | 8/2014 | Grant et al. |
| 2014/0366123 A1 | 12/2014 | Dibona et al. |
| 2014/0378159 A1 | 12/2014 | Dolbakian et al. |
| 2015/0031286 A1* | 1/2015 | Holman ................ H04W 76/10 455/39 |
| 2015/0039880 A1* | 2/2015 | Aminzade ........... H04L 41/0816 713/100 |
| 2015/0058942 A1* | 2/2015 | Dermu .................. G06F 21/445 726/6 |
| 2015/0062022 A1 | 3/2015 | Rabii |
| 2015/0065055 A1 | 3/2015 | Newham et al. |
| 2015/0082406 A1* | 3/2015 | Park .................... H04L 63/0853 726/9 |
| 2015/0182130 A1 | 7/2015 | Utter, II |
| 2015/0186636 A1* | 7/2015 | Tharappel ............... G06F 21/35 726/8 |
| 2015/0215356 A1 | 7/2015 | Kalburgi et al. |
| 2015/0312915 A1 | 10/2015 | Li et al. |
| 2015/0324751 A1* | 11/2015 | Orenstein ........... G06F 19/3481 702/3 |
| 2016/0174025 A1* | 6/2016 | Chaudhri ............... H04B 1/385 455/41.1 |
| 2016/0277891 A1* | 9/2016 | Dvortsov ............. H04W 4/023 |

OTHER PUBLICATIONS

Extended European Search Report dated May 8, 2020, issued in European Patent Application No. 20162872.4.

\* cited by examiner

MECHANISM TO AUTOMATICALLY MANAGE INPUT AND OUTPUT ACROSS CONNECTED WEARABLE DEVICES

CROSS-REFERENCE TO RELATED APPLICATION(S)

This application is a continuation application of prior application Ser. No. 15/592,848, filed on May 11, 2017, and a continuation of prior application Ser. No. 14/683,712, filed on Apr. 10, 2015, which has issued as U.S. Pat. No. 9,794,728 on Oct. 17, 2017 and claimed the benefit under 35 U.S.C. § 119(a) of a Korean patent application filed on Apr. 11, 2014 in the Korean Intellectual Property Office and assigned Serial number 10-2014-0043806, the entire disclosure of which is hereby incorporated by reference.

TECHNICAL FIELD

The present disclosure relates to a method of selecting an external electronic device connected with an electronic device and an electronic device using the same.

BACKGROUND

As the market in wearable devices has expanded, interest in various types of wearable devices has also increased. Users may collect data through wearable devices in various ways. Further, the collected data may be immediately displayed as information through a display or a speaker of the wearable device worn by the user.

However, when data is transmitted/received through a plurality of wearable devices, devices to transmit/receive the data may be redundantly selected. When the received data is displayed, devices to display the data may be redundantly operated.

The redundant selection and operation of the wearable devices may lead to inaccurate transmission of data output to users and also increased power consumption of the devices due to inefficient driving.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of selecting an external electronic device connected with an electronic device and an electronic device using the same which clearly transmit pieces of information to be output to users and efficiently drive a plurality of wearable devices, so as to reduce power consumption through a method of selectively controlling the wearable devices according to types and priorities of the pieces of information to be output.

In accordance with an aspect of the present disclosure, a method of selecting an external electronic device connected with an electronic device is provided. The method includes determining, among the plurality of external electronic devices, at least one external electronic device connected with the electronic device, transmitting signals to the at least one external electronic device, receiving data corresponding to the signals from the at least one external electronic device, selecting one of the at least one external electronic device based on the received data; and transmitting an operation execution signal for the data to the selected external electronic device.

In accordance with another aspect of the present disclosure, an electronic device is provided. The electronic device includes a communication module configured to communicate with a plurality of external electronic devices, a display module configured to display data of an external electronic device selected from among the plurality of external electronic devices and an application processor (AP) configured to select the external electronic device having transmitted data corresponding to a signal among data received from the plurality of external electronic devices, wherein the AP determines, from among the plurality of external electronic devices, at least one external electronic device connected with the electronic device, transmits signals to the plurality of external electronic devices, receives data corresponding to the signals from the plurality of external electronic devices, selects one of the external electronic devices based on the received data, and transmits an operation execution signal to the selected external electronic device.

In accordance with yet another aspect of the present disclosure, a method of selecting an external electronic device connected with an electronic device is provided. The method includes receiving a signal from the electronic device, transmitting data corresponding to the signal to the electronic device, receiving an operation execution signal for the data from the electronic device and performing at least one of various operations according to the operation execution signal.

In accordance with still another aspect of the present disclosure, an electronic device is provided. The electronic device includes a communication module configured to communicate with an electronic device or other external electronic devices, a sensor module configured to measure a sensor value corresponding to a data request signal received from the electronic device and an application processor (AP) configured to select an external device having data corresponding to a signal transmitted from the electronic device among the data received from the external device, wherein the AP receives the signal from the electronic device, transmits the data corresponding to the signal to the electronic device, receives an operation execution signal for the data from the electronic device, and performs at least one of various operations according to the operation execution signal.

The present disclosure provides a method of selecting an external electronic device connected with an electronic device that can accurately transmit output data to a user by selectively controlling a plurality of wearable devices according to the type and priority of information to be output, and can reduce unnecessary power consumption by efficiently driving the wearable devices, and an electronic device using the same.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
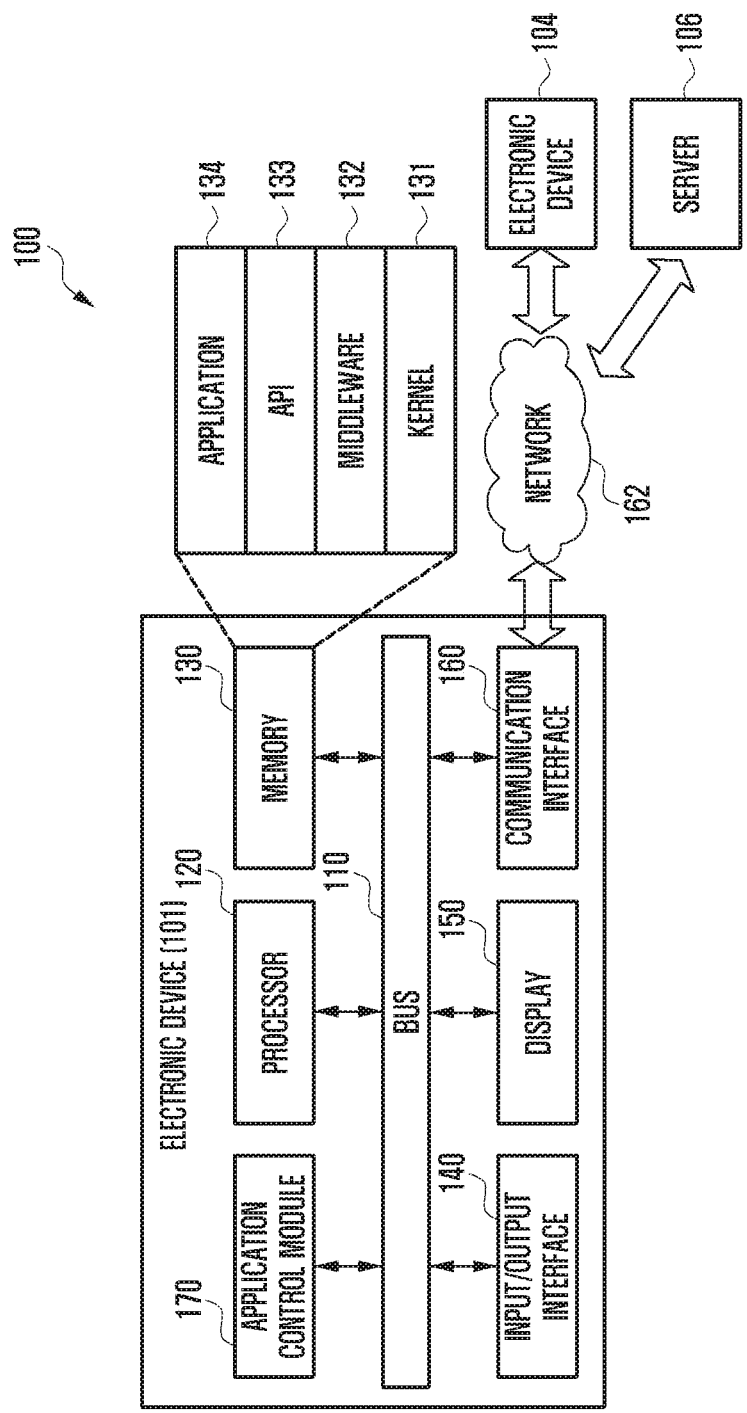
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, operation, constituent element, component or a combination thereof, but may not be construed to exclude the existence of or a possibility of the addition of one or more other characteristics, numbers, operations, constituent elements, components or combinations thereof.

In the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., and/or the like, may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although for both of them the first user device and the second user device are user devices. For example, a first element could be termed a second element, and similarly, a second element could be also termed a first element without departing from the scope of the present disclosure.

In the case where according to which a component is referred to as being "connected" or "accessed" to other component, it should be understood that not only the component is directly connected or accessed to the other component, but also another component may exist between the component and the other component. Meanwhile, in the case where according to which a component is referred to as being "directly connected" or "directly accessed" to other component, it should be understood that there is no component therebetween.

The terms used in the present disclosure are only used to describe specific various embodiments, and are not intended to limit the present disclosure.

Unless otherwise defined, all terms including technical and/or scientific terms used herein have the same meaning as commonly understood by one of ordinary skill in the art to which the present disclosure pertains. In addition, unless otherwise defined, all terms defined in generally used dictionaries may not be overly interpreted.

For example, the electronic device corresponds to a combination of at least one of the followings: a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player (e.g., MP3 player), a mobile medical device, a camera, or a wearable device. Examples of the wearable device are a head-mounted-device (HMD) (e.g., electronic eyeglasses), electronic clothing, an electronic bracelet, an electronic necklace, an appcessory, an electronic tattoo, a smart watch, etc.

The electronic device according to various embodiments of the present disclosure may be smart home appliances. Examples of the smart home appliances are a television (TV), a Digital Video Disk (DVD) player, an audio system, a refrigerator, an air-conditioner, a cleaning device, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, an electronic album, or the like.

The electronic device according to various embodiments of the present disclosure may include at least one of the following: medical devices (e.g., Magnetic Resonance Angiography (MRA), Magnetic Resonance Imaging (MRI), Computed Tomography (CT), a scanning machine, an ultrasonic scanning device, etc.), a navigation device, a Global Positioning System (GPS) receiver, an Event Data Recorder (EDR), a Flight Data Recorder (FDR), a vehicle infotainment device, an electronic equipment for ships (e.g., navigation equipment, gyrocompass, etc.), avionics, a security device, a head unit for vehicles, an industrial or home robot, an automatic teller's machine (ATM), a point of sales (POS) system, etc.

The electronic device according to various embodiments of the present disclosure may include at least one of the following: furniture or a portion of a building/structure, an electronic board, an electronic signature receiving device, a projector, various measuring instruments (e.g., a water meter, an electric meter, a gas meter and a wave meter), etc. respectively. The electronic device according to various embodiments of the present disclosure may also include a combination of the devices listed above. In addition, the electronic device according to various embodiments of the present disclosure may be a flexible device. It is obvious to those skilled in the art that the electronic device according to various embodiments of the present disclosure is not limited to the aforementioned devices.

Hereinafter, electronic devices according to various embodiments of the present disclosure are described in detail with reference to the accompanying drawings. In the description, the term a 'user' may be referred to as a person or a device that uses an electronic device, e.g., an artificial intelligent electronic device.

FIG. 1 illustrates a network environment 100 including an electronic device 101 according to an embodiment of the present disclosure.

Referring to FIG. 1, the electronic device 101 may include a bus 110, a processor 120, a memory 130, an input/output (I/O) interface 140, a display 150, a communication interface 160 and an application control module 170.

The bus 110 may be a communication circuit that connects the components to each other and transfers data (e.g., control messages) between the components.

The processor 120 may receive instructions from the components (e.g., the memory 130, I/O interface 140, display 150, communication interface 160, application control module 170, etc.) via the bus 110, decode them and perform corresponding operations or data processing according to the decoded instructions.

The memory 130 may store instructions or data transferred from/created in the processor 120 or the other components (e.g., the I/O interface 140, display 150, communication interface 160, application control module 170, etc.). The memory 130 may include programming modules, e.g., a kernel 131, middleware 132, application programming interface (API) 133, application module 134, etc. Each of the programming modules may be software, firmware, hardware or a combination thereof.

The kernel 131 may control or manage system resources (e.g., the bus 110, processor 120, memory 130, etc.) used to execute operations or functions of the programming modules, e.g., the middleware 132, API 133, and application module 134. The kernel 131 may also provide an interface that can access and control/manage the components of the electronic device 101 via the middleware 132, API 133, and application module 134.

The middleware 132 may make it possible for the API 133 or application module 134 to perform data communication with the kernel 131. The middleware 132 may also perform control operations (e.g., scheduling, load balancing) for task requests transmitted from the application module 134 by methods, for example, a method for assigning the order of priority to use the system resources (e.g., the bus 110, processor 120, memory 130, etc.) of the electronic device 101 to at least one of the applications of the application module 134.

The API 133 is an interface that allows the application module 134 to control functions of the kernel 131 or middleware 132. For example, the API 133 may include at least one interface or function (e.g., instruction) for file control, window control, character control, video process, etc.

In various embodiments of the present disclosure, the application module 134 may include applications that are related to: Short Message Service (SMS)/Multimedia Messaging Service (MMS), email, calendar, alarm, health care (e.g., an application for measuring the blood sugar level, a workout application, etc.), environment information (e.g., atmospheric pressure, humidity, temperature, etc.), and so on. The application module 134 may be an application related to exchanging information between the electronic device 101 and the external electronic devices (e.g., an electronic device 104). The information exchange-related application may include a notification relay application for transmitting specific information to an external electronic device or a device management application for managing external electronic devices.

For example, the notification relay application may include a function for transmitting notification information, created by the other applications of the electronic device 101 (e.g., SMS/MMS application, email application, health care application, environment information application, etc.), to an external electronic device (e.g., electronic device 104). In addition, the notification relay application may receive notification information from an external electronic device (e.g., electronic device 104) and provide it to the user. The device management application can manage (e.g., to install, delete, or update) part of the functions of an external electronic device (e.g., electronic device 104) communicating with the electronic device 101, e.g., turning on/off the external electronic device, turning on/off part of the components of the external electronic device, adjusting the brightness (or the display resolution) of the display of the external electronic device, etc.; applications operated in the external electronic device; or services from the external electronic device, e.g., call service or messaging service, etc.

In various embodiments of the present disclosure, the application module 134 may include applications designated according to attributes (e.g., type of electronic device) of the external electronic device (e.g., electronic device 104). For example, if the external electronic device is a digital audio player, the application module 134 may include an application related to music playback. If the external electronic device is a mobile medical device, the application module 134 may include an application related to health care. In an embodiment of the present disclosure, the application module 134 may include at least one of the following: an application designated in the electronic device 101 and applications transmitted from external electronic devices (e.g., server 106, electronic device 104, etc.).

The I/O interface 140 may receive instructions or data from the user via an I/O system (e.g., a sensor, keyboard or touch screen) and transfers them to the processor 120, memory 130, communication interface 160 or application control module 170 through the bus 110. For example, the I/O interface 140 may provide data corresponding to a user's touch input to a touch screen to the processor 120. The I/O interface 140 may receive instructions or data from the processor 120, memory 130, communication interface 160 or application control module 170 through the bus 110, and output them to an I/O system (e.g., a speaker or a display). For example, the I/O interface 140 may output voice data processed by the processor 120 to the speaker.

The display 150 may display information (e.g., multimedia data, text data, etc.) on the screen so that the user can view it.

The communication interface 160 may communicate between the electronic device 101 and an external system (e.g., an electronic device 104 or server 106). For example, the communication interface 160 may connect to a network 162 in wireless or wired mode and communicate with the external system. Wireless communication may include at least one of the following: Wireless Fidelity (Wi-Fi), Bluetooth (BT), near field communication (NFC), GPS or cellular communication (e.g., long term evolution (LTE), LTE-advanced (LTE-A), code division multiple access (CDMA), wideband CDMA (WCDMA), universal mobile telephone system (UMTS), wireless broadband (Wi-Bro), global system for mobile communications (GSM), etc.). Wired communication may include at least one of the following: universal serial bus (USB), high definition multimedia interface (HDMI), recommended standard 232 (RS-232), plain old telephone service (POTS), etc.

In an embodiment of the present disclosure, the network 162 may be a telecommunication network. The telecommunication network may include at least one of the following: a computer network, Internet, Internet of things, telephone network, etc. The protocol for communication between the electronic device 101 and the external system, e.g., transport layer protocol, data link layer protocol, or physical layer protocol, may be supported by at least one of the following: application module 134, API 133, middleware 132, kernel 131 and communication module 160.

The application control module 170 may process at least a part of the information acquired from other components (e.g. processor 120, memory 130, I/O interface 140, and communication interface 160) and provides the user with the processing result in various ways. For example, the application control module 170 may control a part of the functions of the electronic device 101 in order for the electronic device 101 to interoperate with other electronic device (e.g. electronic device 104 and server 106) using the processor 120 or independently thereof. According to an embodiment of the present disclosure, at least a part of the application control module 170 may be included in the server 106 such that at least one of the operations of the application control module 170 can be supported by the server 106. Additional information on the application control module 170 is provided through the description hereinafter with reference to FIGS. 2 to 6

Figure 2:
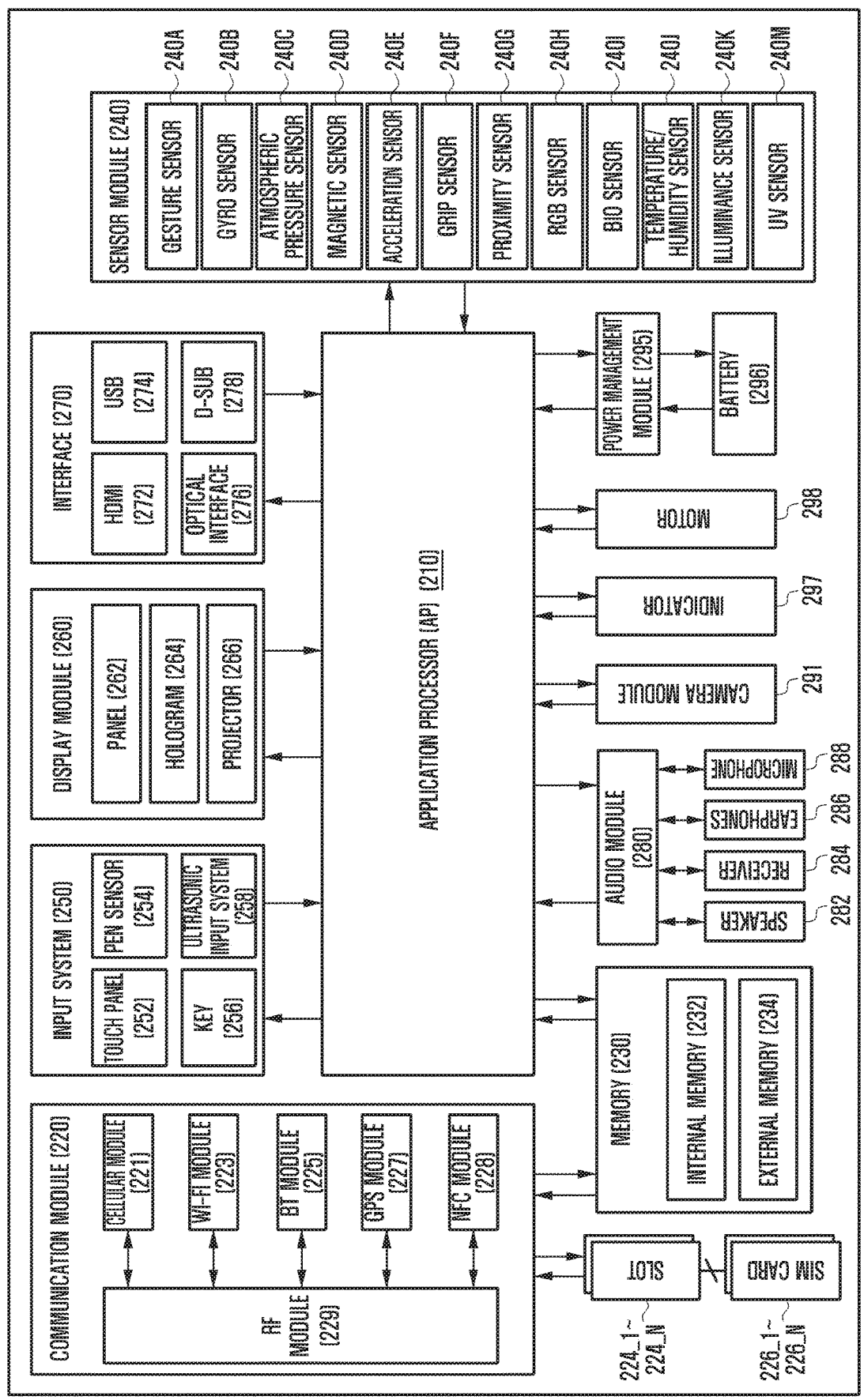
FIG. 2 is a block diagram of an electronic device according to various embodiments of the present disclosure.

FIG. 2 illustrates a schematic block diagram of an electronic device 200 according to an embodiment of the present disclosure. The electronic device may be part or all of electronic device 101 or 104 as shown in FIG. 1.

Referring to FIG. 2, the electronic device 200 may include one or more processors of the application processor (AP) 210, a communication module 220, subscriber identification module (SIM) cards 226_1 to 226_N, a memory 230, a sensor module 240, an input system 250, a display module 260, an interface 270, an audio module 280, a camera module 291, a power management module 295, a battery 296, an indicator 297, and a motor 298.

The AP 210 may control a number of hardware or software components connected thereto by executing the operation system or applications, process data including multimedia data, and perform corresponding operations. The AP 210 may be implemented with a system on chip (SoC). In an embodiment of the present disclosure, the AP 210 may further include a graphic processing unit (GPU).

The communication module 220 (e.g., communication interface 160) performs communication for data transmission/reception between the other electronic devices (e.g., an electronic device 104, server 106) that are connected to the electronic device (e.g., electronic device 101) via the network. In an embodiment of the present disclosure, the communication module 220 may include a cellular module 221, a Wi-Fi module 223, a BT module 225, a GPS module 227, an NFC module 228 and a radio frequency (RF) module 229.

The cellular module 221 may provide voice call, video call, SMS or Internet service, etc., via a communication network (e.g., LTE, LTE-A, CDMA, WCDMA, UMTS, Wi-Bro, GSM, etc.). The cellular module 221 may perform identification or authentication for electronic devices in a communication network by using their SIM cards (e.g., SIM cards 226_1 to 226_N). In an embodiment of the present disclosure, the cellular module 221 may perform part of the functions of the AP 210. For example, the cellular module 221 may perform part of the functions for controlling multimedia.

In an embodiment of the present disclosure, the cellular module 221 may include a communication processor (CP). The cellular module 221 may be implemented with, for example, an SoC. Although the embodiment of the present disclosure shown in FIG. 2 is implemented in such a way that the cellular module 221 (e.g., communication processor), the power management module 295, the memory 230, etc., are separated from the AP 210, it can be modified in such a way that the AP 210 includes at least part of those (e.g., cellular module 221).

In an embodiment of the present disclosure, the AP 210 or the cellular module 221 (e.g., communication processor) may load instructions or data transmitted from at least one of the following: non-volatile memory or other components, on a volatile memory and then process them. The AP 210 or the cellular module 221 may also store data in a non-volatile memory, which is transmitted from/created in at least one of the other components.

The Wi-Fi module 223, the BT module 225, the GPS module 227 and the NFC module 228 may include processors for processing transmission/reception of data, respectively. Although the embodiment of the present disclosure shown in FIG. 2 is implemented in such a way that the cellular module 221, Wi-Fi module 223, BT module 225, GPS module 227, and NFC module 228 are separated from each other, it can be modified in such a way that part of those (e.g., two or more) are included in an integrated chip (IC) or an IC package. For example, part of the processors corresponding to the cellular module 221, Wi-Fi module 223, BT module 225, GPS module 227, and NFC module 228, e.g., a communication processor corresponding to the cellular module 221 and a Wi-Fi processor corresponding to the Wi-Fi module 223, may be implemented with an SoC.

The RF module 229 may transmit or receive data, e.g., RF signals. The RF module 229 may include a transceiver, a power amplifier module (PAM), a frequency filter, a low noise amplifier (LNA), etc. The RF module 229 may also include parts for transmitting/receiving electromagnetic waves, e.g., conductors, wires, etc., via free space during wireless communication. Although the embodiment of the present disclosure shown in FIG. 2 is implemented in such a way that the cellular module 221, Wi-Fi module 223, BT module 225, GPS module 227, and NFC module 228 share the RF module 229, it can be modified in such a way that at least one of those transmits or receives RF signals via a separate RF module.

The SIM cards 226_1 to 226_N may be cards with a SIM. The SIM cards 226_1 to 226_N may be fitted into corresponding slots 224_1 to 224_N of the electronic device. The SIM cards 226_1 to 226_N may include unique identification information, e.g., integrated circuit card identifier (IC-CID), or subscriber information, e.g., international mobile subscriber identity (IMSI).

The memory 230 (e.g., memory 130) may include built-in memory 232 and/or external memory 234. The built-in memory 232 may include at least one of the following: volatile memory, e.g., dynamic RAM (DRAM), static RAM (SRAM), synchronous DRAM (SDRAM), etc.; non-volatile memory, e.g., one time programmable ROM (OTPROM), programmable ROM (PROM), erasable and programmable ROM (EPROM), electrically erasable and programmable ROM (EEPROM), mask ROM, flash ROM, not and (NAND) flash memory, not or (NOR) flash memory, etc.

In an embodiment of the present disclosure, the built-in memory 232 may be a Solid State Drive (SSD). The external memory 234 may further include a flash drive, e.g., compact flash (CF), secure digital (SD), micro-SD, mini-SD, extreme digital (XD), a memory stick, etc. The external memory 234 may be functionally connected to the electronic device via various types of interface. In an embodiment of the present disclosure, the electronic device 101 may further include storage devices (or storage media) such as hard drives.

The sensor module 240 may measure a physical quantity or sense operation states of the electronic device 101 and convert the measured or sensed data into electrical signals. The sensor module 240 may include at least one of the following: gesture sensor 240A, gyro sensor 240B, atmospheric pressure sensor 240C, magnetic sensor 240D, acceleration sensor 240E, grip sensor 240F, proximity sensor 240G, color sensor 240H (e.g., red-green-blue (RGB) sensor), biosensor 240I, temperature/humidity sensor 240J, luminance sensor 240K, and ultra-violet (UV) sensor 240M.

The sensor module 240 may also include an e-nose sensor, electromyography (EMG) sensor, an electroencephalogram (EEG) sensor, an electrocardiogram (ECG) sensor, Infra-Red (IR) sensor, a fingerprint sensor, iris sensor, etc. The sensor module 240 may further include a control circuit for controlling one or more sensors.

The input system 250 may include a touch panel 652, a pen sensor 254 (i.e., a digital pen sensor), a key 256 and an ultrasonic input system 258. The touch panel 252 may sense touches in at least one of the following: capacitive sensing mode, pressure sensing mode, infrared sensing mode, and ultrasonic sensing mode. The touch panel 252 may further include a control circuit. When the touch panel 252 is designed to operate in capacitive sensing mode, it can sense mechanical/physical touches or proximity of an object. The touch panel 252 may further include a tactile layer. In that case, the touch panel 252 can provide tactile feedback to the user.

The pen sensor 254 (i.e., digital pen sensor) may be implemented in the same or similar way as receiving a user's touch input or by using a separate recognition sheet. The key 256 may include mechanical buttons, optical keys or a key pad. The ultrasonic input system 258 is a device that can sense sounds via a microphone 288 of the electronic device 101 by using an input tool for generating ultrasonic signals and can check the data. The ultrasonic input system 258 can sense signals in wireless mode. In an embodiment of the present disclosure, the electronic device 101 may receive a user's inputs from an external system (e.g., a computer or server) via the communication module 220.

The display module 260 (e.g., display 150) may include a panel 262, a hologram unit 264, or a projector 266. The panel 262 may be implemented with a Liquid Crystal Display (LCD), Active Matrix Organic Light Emitting Diodes (AMOLEDs), or the like. The panel 262 may be implemented in a flexible, transparent, or wearable form. The panel 262 may form a single module with the touch panel 252. The hologram unit 264 shows a three-dimensional image in the air using interference of light. The projector 266 may display images by projecting light on a screen. The screen may be placed, for example, inside or outside the electronic device 101. In an embodiment of the present disclosure, the display module 260 may further include a control circuit for controlling the panel 262, the hologram unit 264, or the projector 266.

The interface 270 may include an HDMI 272, a USB 274, an optical interface 276, a D-subminiature (D-sub) 278, etc. The interface 270 may also be included in the communication interface 160 shown in FIG. 1. The interface 270 may also include a mobile high-media card (MHL) interface, an SD card, a multi-media card (MMC) interface, an infrared data association (IrDA) standard interface, or the like.

The audio module 280 may convert between audio and electrical signals. At least part of the components in the audio module 280 may be included in the I/O interface 140 shown in FIG. 1. The audio module 280 may process audios output from/input to, for example, a speaker 282, a receiver 284, earphones 286, a microphone 288, etc.

The camera module 291 may take still images or moving images. In an embodiment of the present disclosure, the camera module 291 may include one or more image sensors (e.g., on the front side and/or the back side), a lens, an image signal processor (ISP), a flash (e.g., an LED or a xenon lamp), or the like.

The power management module 295 may manage electric power supplying to the electronic device 101. The power management module 295 may include a power management IC (PMIC), a charger IC, a battery or fuel gauge, etc.

The PMIC may be implemented in the form of IC chip or SoC. Charging electric power may be performed in wired or wireless mode. The charger IC may charge a battery, preventing input over-voltage or input over-current from inputting to the battery from a charger. In an embodiment of the present disclosure, the charger IC may be implemented with a wired charging type and/or a wireless charging type. Examples of the wireless charging type of charger IC are a magnetic resonance type, a magnetic induction type, an electromagnetic type, etc. If the charger IC is implemented with a wireless charging type, it may include an additional circuit for wireless charging, e.g., a coil loop, a resonance circuit, a rectifier, etc.

The battery gauge may measure the residual amount of battery 296, the level of voltage, the level of current, temperature during the charge. The battery 296 charges electric power and supplies it to the electronic device 101. The battery 296 may include a rechargeable battery or a solar battery.

The indicator 297 shows states of the electronic device 101 or of the parts (e.g., AP 210), e.g., a booting state, a message state, a recharging state, etc. The motor 298 converts an electrical signal into a mechanical vibration. Although it is not shown, the electronic device 101 may include a processor for supporting a mobile TV, e.g., a GPU. The mobile TV supporting processor may process media data that comply with standards of digital multimedia broadcasting (DMB), digital video broadcasting (DVB), media flow, etc.

Each of the elements/units of the electronic device according to the present disclosure may be implemented with one or more components, and be called different names according to types of electronic devices. The electronic device according to the present disclosure may include at least one element described above. The electronic device may be modified in such a way as to remove part of the elements or include new elements. In addition, the electronic device according to the present disclosure may also be modified in such a way that parts of the elements are integrated into one entity that performs their original functions.

In the present disclosure, the terminology '~module' refers to a 'unit' including hardware, software, firmware or a combination thereof. For example, the terminology '~module' is interchangeable with unit, '~logic,' '~logical block,' '~component,' '~circuit,' etc. A 'module' may be the least unit or a part of an integrated component. A 'module' may be the least unit or a part thereof that can perform one or more functions. A 'module' may be implemented in mechanical or electronic mode. For example, 'modules' according to various embodiments of the present disclosure may be implemented with at least one of the following: an application specific IC (ASIC) chip, field-programmable gate array (FPGAs) and a programmable-logic device that can perform functions that are known or will be developed.

An electronic device according to various embodiments of the present disclosure may include a communication module including a BT module for communicating with external devices, a display module for displaying data of an external device selected from the external devices, and an application processor for selecting an external device having transmitted data corresponding to a signal among data received from the external devices, wherein the application processor transmits signals to the external devices, receives data for the signals from the external devices, selects one of the external devices based on the received data, and transmits an operation execution signal to the selected external device.

An electronic device according to various embodiments of the present disclosure may include a communication module for communicating with the external devices, a display module for displaying data of an external device selected from the external devices, and an application processor for selecting an external device having transmitted data corresponding to a signal among data received from the external devices, wherein the application processor transmits signals to the external devices, receives data for the signals from the external devices, selects one of the external devices based on the received data, and transmits an operation execution signal to the selected external device.

An electronic device according to various embodiments of the present disclosure may include a display module for displaying data received from an external device, a communication module for communicating with the electronic device or the external device, a sensor module for measuring a sensor value corresponding to a data request signal received from the electronic device, and an application processor for selecting an external device to transmit data corresponding to a signal transmitted from the electronic device among the data received from the external device, wherein the application processor receives the signal from the electronic device, transmits the data corresponding to the signal to the electronic device, receives an operation execution signal for the data from the electronic device, and performs at least one of various operations according to the operation execution signal.

Figure 3A:
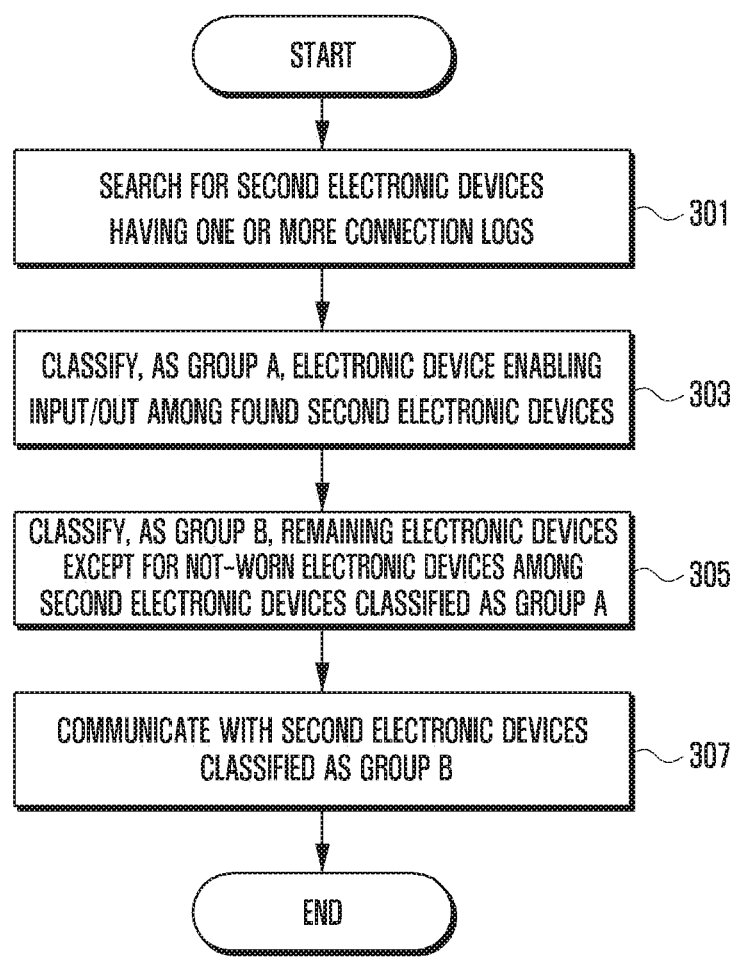
FIGS. 3A, 3B, and 3C are flowcharts illustrating operations for classifying the second electronic devices to output data according to various embodiments of the present disclosure.
Figure 3B:
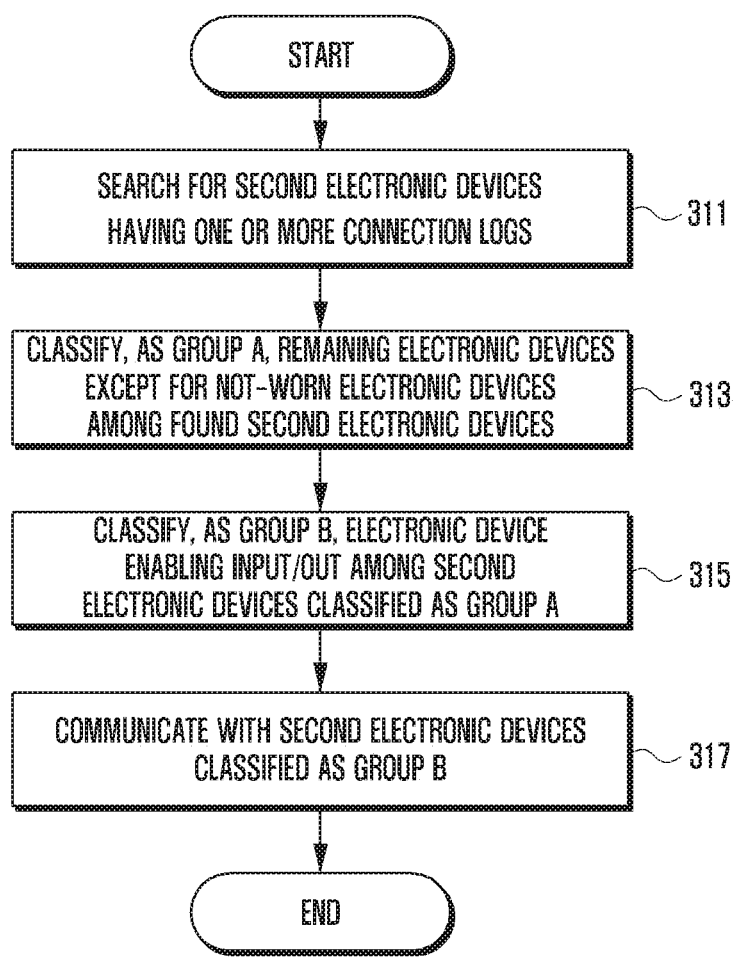
Figure 3C:
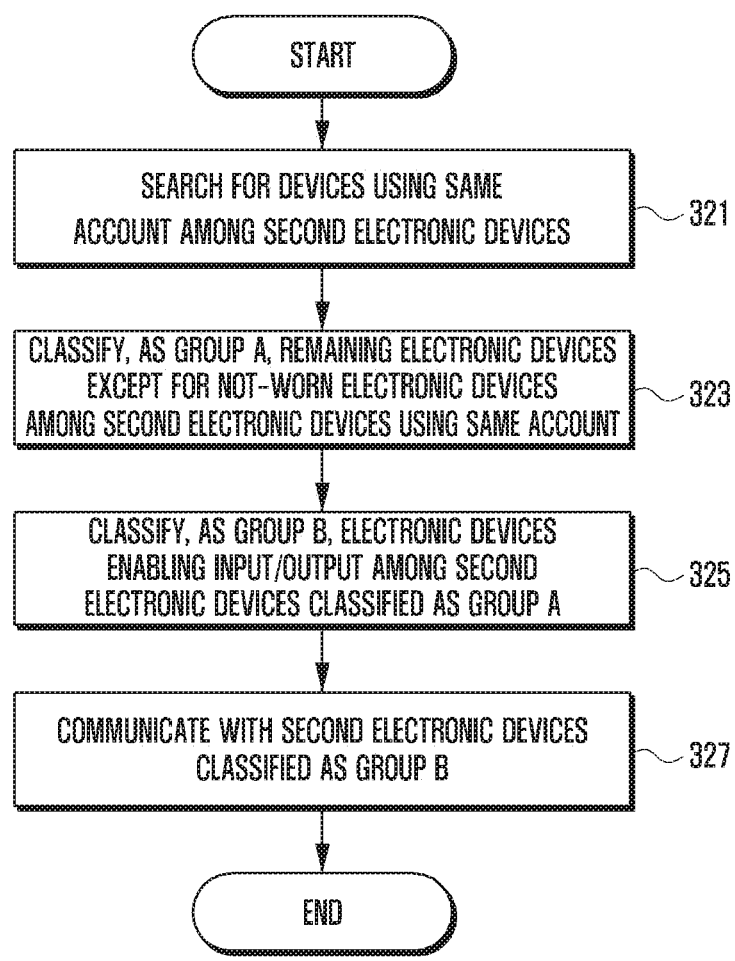

In one of the various embodiments of the present disclosure, currently connected electronic devices are classified based on flowcharts illustrated in FIGS. 3A, 3B, and 3C.

Referring to FIG. 3A, the AP 210 of the first electronic device 101 may search for second electronic devices having one or more connection logs through the BT module 225 in operation 301. The first electronic device 101 may identify a BT communication log list to search for the second electronic devices having the connection log. In operation 303, AP 210 of the first electronic device 101 may classify second electronic devices that can receive a data output command signal and output the data among the found second electronic devices, and may designate the classified second electronic devices as group A. The AP 210 of the first electronic device 101 may classify, as group B, the remaining electronic devices except for the non-connected second electronic device 104 among the second electronic devices classified as group A in operation 305. Whether the second electronic devices are in a non-connected state may be determined through sensing by sensors of the sensor modules of the second electronic devices. Among the sensors of the sensor module, particularly, a proximity sensor may determine whether the second electronic device is in a connected state. In operation 307, the AP 210 of the first electronic device 101 may communicate with the second electronic devices of group B through BT communication.

Referring to FIG. 3B, the AP 210 of the first electronic device 101 may search for second electronic devices having one or more connection logs through the BT module 225 in operation 311. The AP 210 of the first electronic device 101 may identify a BT communication log list to search for the second electronic devices having the connection log. The AP 210 of the first electronic device 101 may classify, as group A, the remaining electronic devices except for the non-connected second electronic device 104 among the found second electronic devices in operation 313. Whether the second electronic devices are connected or not may be determined through sensing by sensors of the sensor modules of the second electronic devices. Among the sensors of the sensor module, particularly, a proximity sensor may determine whether the second electronic device is in a connected state. In operation 315, the AP 210 of the first electronic device 101 may classify second electronic devices, which can receive a data output command signal and output the data, among the second electronic device of group A, and may designate the classified second electronic devices as group B. In operation 317, the AP 210 of the first electronic device 101 may communicate with the second electronic devices of group B.

Referring to FIG. 3C, the AP 210 of the first electronic device 101 may search for devices using the same account among the second electronic devices in operation 321. The AP 210 of the first electronic device 101 may classify, as group A, the remaining electronic devices except for the second electronic device 104, which is not connected to the first electronic device 101, among the second electronic devices using the same account in operation 323. Whether the second electronic devices are in a non-connected state may be determined through sensing by sensors of the sensor modules of the second electronic devices. Among the sensors of the sensor module, particularly, a proximity sensor may determine whether the second electronic device is a connected state. In operation 325, the AP 210 of the first electronic device 101 may classify second electronic devices, which can receive a data output command signal and output the data, among the second electronic device of group A, and may designate the classified second electronic devices as group B. In operation 327, the AP 210 of the first electronic device 101 may communicate with the second electronic devices of group B by controlling the BT module 225.

In one of the various embodiments of the present disclosure, the optimal second electronic device 104 may be determined by identifying types of data to be output and states of the second electronic devices to output the data.

For example, when the AP 210 of the first electronic device 101 is to output vibrations, the AP 210 may receive corresponding sensor values from sensor modules of the second electronic devices, particularly, a gyro sensor or an acceleration sensor to detect motions of the second electronic devices. The AP 210 of the first electronic device 101 may determine through the sensor values whether the second electronic devices are currently moving or not. Since the AP 210 of the first electronic device 101 desires to output the vibrations, the AP 210 may select the second electronic device 104 having the smallest motion, that is, the smallest sensor value received from the sensor module. The AP 210 of the first electronic device 101 may control the BT module 225 to transmit a vibration output command signal to the selected second electronic device 104. For example, when the user is walking, the AP 210 of the first electronic device 101 may transmit a signal for outputting data to a wristband which moves relatively less than a shoe rather than outputting data through the shoe.

For example, when the AP 210 of the first electronic device 101 desires to output a voice, the AP 210 may select a device having the smallest ambient noise based on input values of microphones of the second electronic devices having the microphones. Further, the AP 210 may select the second electronic device 104 that can output a volume level of the voice to be output from the first electronic device 101.

For example, when the AP 210 of the first electronic device 101 desires to output visual information such as a color, the AP 210 may recognize a state of the second electronic device 104 through the sensor modules of the second electronic devices, particularly, an IR sensor or an illumination sensor. Alternatively, the recognition is made through a combination of the IR sensor and the illumination sensor. Further, when the second electronic device 104 includes a camera, the AP 210 of the first electronic device 101 may recognize whether the user looks at the second electronic device 104. The AP 210 of the first electronic device 101 may select the second electronic device 104 at which the user looks or the second electronic device 104 having small obstructions from data of the sensors. When the user currently puts their hands into their pockets, the AP 210 of the first electronic device 101 may select a shoe or a necklace which is relatively less obstructed without displaying visual information through a ring. The shoe or necklace which is the selected second electronic device 104 may display the visual information received from the second electronic device 104 by controlling an LED.

One of the various embodiments of the present disclosure may correspond to all embodiments in common.

The AP 210 of the first electronic device 101 may select the second electronic device 104 to output data. Alternatively, the AP 210 of the first electronic device 101 may select the second electronic device 104 to output data by comparing pieces of data between the second electronic devices. When selecting the second electronic device 104, the AP 210 of the first electronic device 101 may identify a battery state. The second electronic device 104 may require a significant amount of power consumption to display data or perform an operation according to the data. Accordingly, in selecting the second electronic device 104, identifying whether the battery state is higher than or equal to a predetermined level is a top priority.

One of the various embodiments of the present disclosure may be described through Table 1. Table 1 shows optimal output data of second electronic devices according to an embodiment of the present disclosure.

TABLE 1

| Second electronic device | Output data |
| --- | --- |
| Shoe | Number of steps |
| Headband | Bone conduction/Volume |
| Wristband | Pulse/Heartbeat |
| Ring | Pulse/Heartbeat |

Referring to Table 1, the type of optimal data according to the second electronic device 104 may be pre-defined in various embodiments of the present disclosure. For example, the AP 210 of the first electronic device 101 may instruct the second electronic devices to transmit data related to the user's pulse. The second electronic devices, for example, the shoe and the wristband in Table 1 may attempt to transmit the data related to the signal received from the first electronic device 101. The second electronic devices may transmit the data related to the signal received from the first electronic device 101 to the first electronic device 101. The AP 210 of the first electronic device 101 may determine data which is most suitable for the user's pulse among the received data. Since the wristband is a device suitable for outputting the user's pulse between the shoe and the wristband, the AP 210 of the first electronic device 101 may select the wristband and control the display unit to output data received from the wristband for the user or perform an operation for displaying the data.

Further, the second electronic devices having received the instruction, for example, the wristband and the ring in Table 1 may collect user pulse data from sensors of the devices and transmit the collected data to the first electronic device 101. When the AP 210 of the first electronic device 101 determines that a plurality of pieces of received data correspond to pieces of data received from the second electronic devices, which are most suitable for outputting a pulse, the AP 210 of the first electronic device 101 may calculate an average value of the plurality of pieces of data. The AP 210 of the first electronic device 101 may calculate an average value of a plurality of pieces of data and control the display unit to output the calculated average value for the user or perform an operation for displaying the data.

As shown in Table 1, the second electronic devices 104 may output different types of data. Each of the second electronic devices 104 may receive a signal of the first electronic device 101 and transmit data related to the signal to the first electronic device 101. At this time, the second electronic device 104 may transmit the data to the first electronic device on a predetermined cycle. The second electronic device 104 may transmit data to the first electronic device 101 on different cycles according to the data type. For example, pulse and heartbeat data types may be transmitted to the first electronic device 101 every second to monitor user health. The data type such as the number of operations may be transmitted to the first electronic device 101 every 30 minutes to monitor a quantity of exercise performed by the user. The data type such as a cholesterol level may be transmitted to the first electronic device 101 at each meal time. This is so the AP 210 of the first electronic device 101 can monitor which food is good for a following meal. Further, the data type such as body temperature may be transmitted to the first electronic device 101 every minute. This is so the AP 210 of the first electronic device 101 can monitor the user's health for the same reason as that of monitoring the user's pulse and heartbeat.

The various embodiments of the present disclosure for selecting the second electronic device 104 to I/O data can be applied to FIGS. 4 to 6 below.

Figure 4:
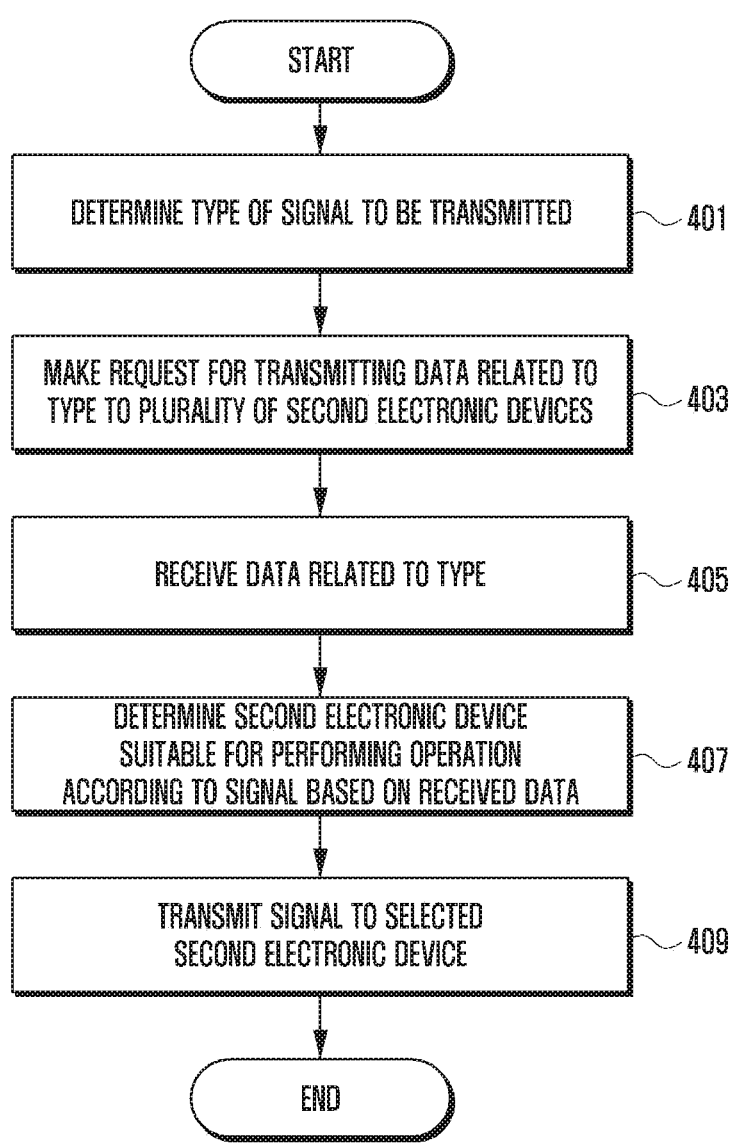
FIG. 4 is a flowchart illustrating an operation of a first electronic device 101 according to various embodiments of the present disclosure.

FIG. 4 is a flowchart illustrating an operation of the first electronic device 101 according to various embodiments of the present disclosure.

Referring to FIG. 4, the AP 210 of the first electronic device 101 may determine the type of signal to be transmitted to the second electronic devices in operation 401. The electronic devices that can output the signal may vary depending on the signal type. After determining the signal type, the AP 210 of the first electronic device 101 may transmit the signal to the second electronic devices. In operation 403, the AP 210 of the first electronic device 101 may make a request for transmitting pieces of data related to the signal type to a plurality of second electronic devices. In operation 405, the AP 210 of the first electronic device 101 may receive the pieces of data related to the signal type from the second electronic devices. In operation 407, the AP 210 of the first electronic device 101 may determine the second electronic device 104 suitable for performing an operation according to the signal based on the pieces of data received from the second electronic devices. A process for determining the second electronic device 104 may include the above described various embodiments of the present disclosure. In operation 409, the AP 210 of the first electronic device 101 may control the BT module 225 to transmit the signal to the second electronic device 104 which is determined as the suitable device.

Figure 5:
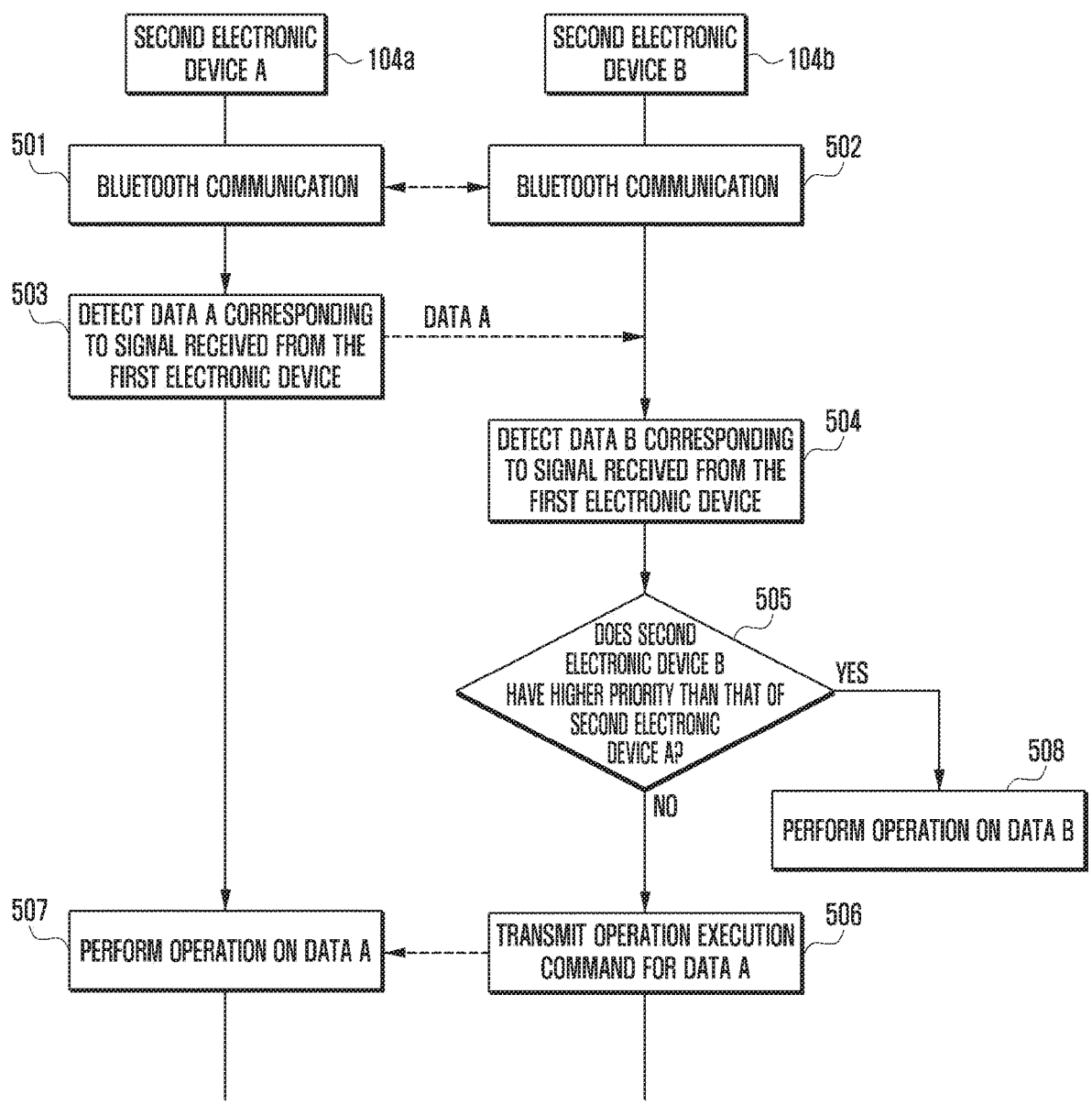
FIG. 5 is a flowchart illustrating operations of a plurality of second electronic devices according to an embodiment of the present disclosure.

FIG. 5 is a flowchart illustrating an operation of a plurality of second electronic devices according to an embodiment of the present disclosure.

Referring to FIG. 5, a plurality of second electronic devices may transmit/receive data, and determine to perform operations. In operations 501 to 502, a second electronic device A 104a and a second electronic device B 104b may transmit/receive at least one of a signal and data through BT communication. The second electronic device A 104a may detect data to be output for a signal received from the first electronic device 101 in operation 503, although this is not illustrated in FIG. 5. In operation 503, the second electronic device A 104a may transmit the detected data A to the second electronic device B 104b which is different from the second electronic device A 104a. The second electronic device B 104b may receive the data A transmitted from the second electronic device A 104a, and also may detect data B to be output for a signal received from the first electronic device 101 in operation 504, although this is not illustrated in FIG. 5. In operation 505, it may be determined whether data B has a higher priority than data A. The priority may be configured not to overlap a plurality of second electronic devices to output one output data. When a processor of the second electronic device B 104b determines that data A has a higher priority than data B in operation 505, the second electronic device B 104b may proceed to operation 506 and transmit a command performing an operation for data A. In operation 507, the second electronic device A 104a may perform the operation for data A in response to the command received from the second electronic device B 104b. When the second electronic device B 104b determines that data A has a higher priority than data B in operation 505, the second electronic device B 104b may proceed to operation 508 and perform an operation for data B. In operation 505, the process of determining the priority may include a simple comparison between data A and data B. Further, the process of determining the priority may include a process of comparing states of the second electronic device having transmitted data and selecting data transmitted by an optimal second electronic device.

Figure 6:
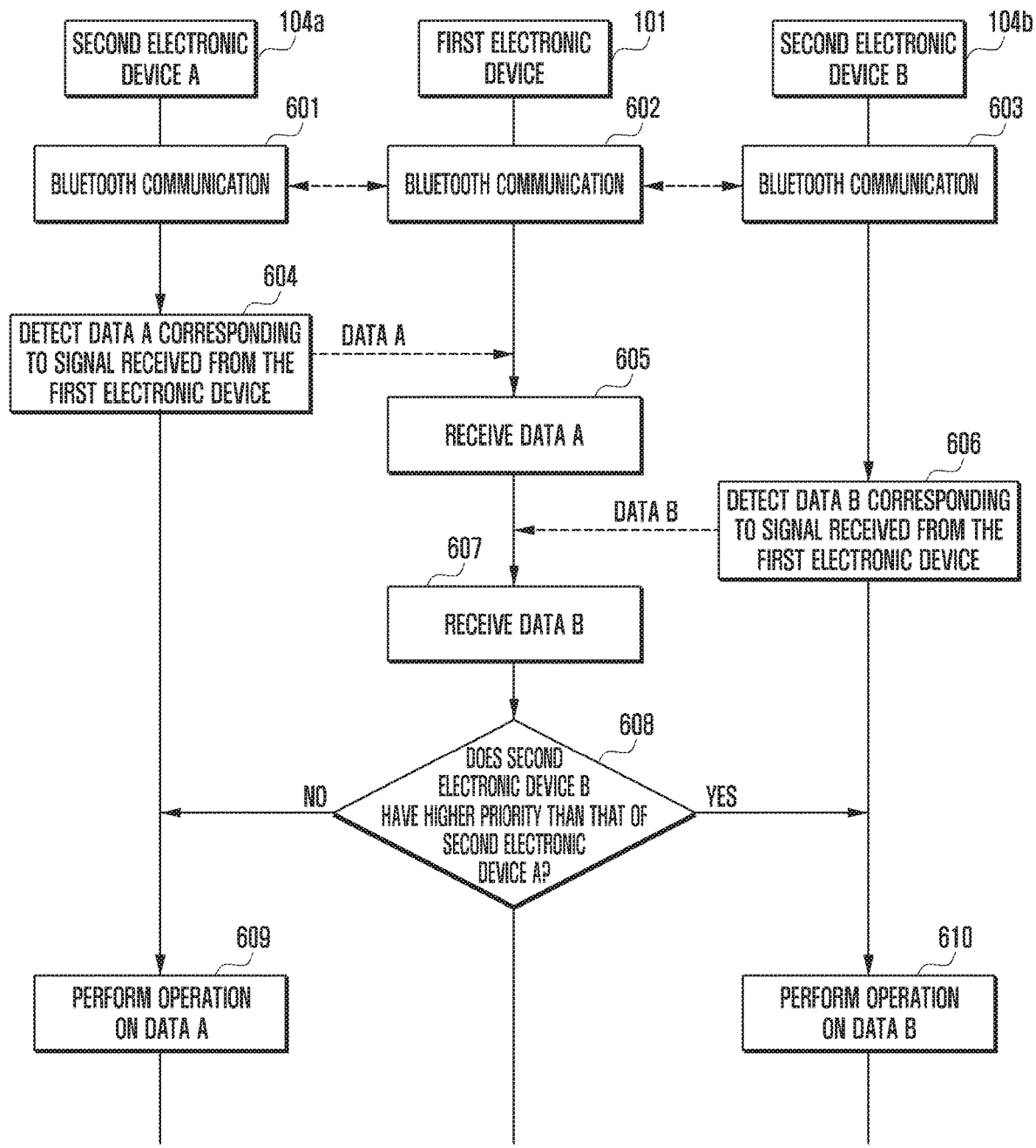
FIG. 6 is a flowchart illustrating operations of a first electronic device and a plurality of second electronic devices according to an embodiment of the present disclosure.

FIG. 6 is a flowchart illustrating operations of the first electronic device 101 and a plurality of second electronic devices according to an embodiment of the present disclosure.

Referring to FIG. 6, in operations 601, 602, and 603, the first electronic device 101, the second electronic device A 104a, and the second electronic device B 104b may transmit/receive signals through BT communication. Although FIG. 3 illustrates an operation performed by three electronic devices, a plurality of second electronic devices and the first electronic devices 101 may transmit/receive signals through BT communication. The second electronic device A 104a may detect data A to be output for a signal, which is not illustrated in FIG. 6 but received from the first electronic device 101, that is, data A corresponding to a condition in operation 604. The second electronic device A 104a may transmit data A to the first electronic device 101 by controlling the BT module 225. In operation 605, the first electronic device may receive data A from the second electronic device A 104a. The second electronic device B 104b may detect data B to be output for a signal, which is not illustrated in FIG. 6 but received from the first electronic device 101, that is, data B corresponding to a condition in operation 606. The second electronic device B 104b may transmit data B to the first electronic device 101 by controlling the BT module 225. In operation 607, the AP 210 of the first electronic device 101 may receive data B from the second electronic device B 104b. In operation 608, the AP 210 of the first electronic device 101 may determine priorities of data received from the second electronic device A 104a and the second electronic device B 104b. In operation 608, the process of determining the priority may include a simple comparison between data A and data B. Further, the process of determining the priority may include a process of comparing states of the second electronic device having transmitted data and selecting data transmitted by an optimal second electronic device.

When the AP 210 of the first electronic device determines that data A has a higher priority, the first electronic device 101 may transmit a signal performing an operation on a signal to the second electronic device A 104a. In operation 609, the second electronic device A 104a may perform the operation for data A. When the AP 210 of the first electronic device 101 determines that data A has a higher priority, the first electronic device 101 may transmit a signal performing an operation on a signal to the second electronic device B 104b in operation 608. In operation 610, the second electronic device B 104b may perform the operation for data B.

Table 2 shows weighted values for determining the second electronic devices to I/O data according to an embodiment of the present disclosure.

TABLE 2

| Input/output (I/O) function | First selection | Second selection | Third selection | Fourth selection | Fifth selection |
|---|---|---|---|---|---|
| Notification (output) | Head Mounted Display (HMD) | Smart watch | Ring | Smart phone | — |
| Time (output) | Smart watch | Head Mounted Display (HMD) | Ring | Smart phone | — |
| Pedometer (input) | Shoe activity tracker | Smart watch | Smart phone | Head Mounted Display (HMD) | Ring |
| Heart rate monitor (input) | Ring | Smart watch | Head Mounted Display (HMD) mounted display) | Smart phone | — |
| Device control (input) | Ring | Smart watch | Smart phone | Head Mounted Display (HMD) | — |
| Voice (output) | Head Mounted Display (HMD) | Smart phone | Smart watch | — | — |

Table 3 is a table showing weighted values for selecting second electronic devices according to an embodiment of the present disclosure.

TABLE 3

| Selection degree of table | Battery state | User preference | Processor load | Context |
|---|---|---|---|---|
| 30% | 40% | 20% | 5% | 5% |

Table 2 above may list sequences to select the second electronic devices based on each I/O function. Table 3 shows weighted values defined with Table 2. The weighted values in Table 3 may be changed by the user. The AP 210 of the first electronic device 101 may store the above tables in the cloud. The cloud may refer to an external service, not internal storage space, and the electronic device connected to a server may download or upload various types of information. The AP 210 of the first electronic device 101 may transmit a signal by controlling the BT module 225 to output data to the second electronic device 104 which is automatically determined according to Table 3 based on I/O functions.

The first electronic device 101 and a plurality of second electronic devices 104 may be connected through BT communication. The AP 210 of the first electronic device 101 may identify Tables 2 and 3 through the cloud. An operation for determining the second electronic device 104 may be performed by the cloud or the AP 210 of the first electronic device 101. Based on the weighted values of Table 3, a predetermined value is assigned to each state. Values from 1 to 5 may be assigned according to the selection sequences of Table 2. As a battery state grows closer to full charge, a high value is assigned. A high value may be assigned as 2, a medium value may be assigned as 24, and a low value may be assigned as 6. As the processor load becomes larger, a 'high' value is assigned. A high value may be assigned as 0.27, a medium value may be assigned as 0.5, and a low value may be assigned as 0.25. As a user preference grows, 1 is assigned. Values from 1 to 3 may be assigned. As the influence of the context becomes stronger, a high value is assigned. A high value may be assigned as 3, a medium value may be assigned as 2, and a low value may be assigned as 1. The assigned values may be changed by the user.

For example, the AP 210 of the first electronic device 101 may select the second electronic device 104 to output a time function. The second electronic device 104 may be determined according to the weighted value of Table 3. According to Table 2, the second electronic device 104 to be selected first to output time is a smart watch. Further, when a battery state of a smart watch is medium, a load degree of a processor is medium, user preference is low, and context is low, the following equation may be determined:

$$(0.3\times1)+(0.4\times24)+(0.2\times0.5)+(0.05\times3)+(0.05\times1)=3.48 \quad \text{Equation 1}$$

Under the same conditions for outputting a time function, an equation to select a ring may be expressed below:

$$(0.3\times3)+(0.4\times24)+(0.2\times0.5)+(0.05\times3)+(0.05\times1)=4.08 \quad \text{Equation 2}$$

When the first electronic device 101 or a cloud determines the second electronic device 104 by using a weighted value, the second electronic device 104 having a small calculated value is selected.

A method of selecting an external electronic device connected with an electronic device according to various embodiments of the present disclosure may include determining, among the plurality of external electronic devices, at least one external electronic device connected with the electronic device, transmitting signals to the at least one external electronic device, receiving data corresponding to the signals from the at least one external electronic device, selecting one of the at least one external electronic device based on the received data; and transmitting an operation execution signal for the data to the selected external electronic device.

A method of selecting an external electronic device connected with an electronic device according to various embodiments of the present disclosure may include receiving a signal from the electronic device, transmitting data corresponding to the signal to the electronic device, receiving an operation execution signal for the data from the electronic device and performing at least one of various operations according to the operation execution signal.

Examples of non-transitory computer-readable media include: magnetic media, such as hard disks, floppy disks, and magnetic tape; optical media such as Compact Disc ROM (CD-ROM) disks and DVDs; magneto-optical media, such as floptical disks; and hardware devices that are specially configured to store and perform program instructions (e.g., programming modules), such as ROM, RAM, flash memory, etc. Examples of program instructions include machine code instructions created by assembly languages, such as a compiler, and code instructions created by a high-level programming language executable in computers using an interpreter, etc. The described hardware devices may be configured to act as one or more software modules including program instructions that cause a computer or processor to perform the operations and methods described above, or vice versa. The one or more software modules may be stored on the non-transitory computer-readable media.

Modules or programming modules according to various embodiments of the present disclosure may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for notifying an external electronic device connected with an electronic device, the method comprising:
   receiving, in a case that at least one external electronic device is connected with the electronic device, a signal from the at least one external electronic device;
   determining whether the at least one external electronic device is being worn or not being worn based on the received signal;
   identifying whether there is notification information to be transmitted to the at least one external electronic device;
   determining whether the at least one external electronic device connected with the electronic device uses a same account as that of the electronic device;
   transmitting the notification information to a first external electronic device selected from the at least one external electronic device in a case that the first external electronic device uses the same account as the electronic device and the first external electronic device is being worn; and
   transmitting the notification information to a second external electronic device selected from the at least one external electronic device in a case that the first external electronic device does not use the same account as the electronic device or the first external electronic device is not being worn.

2. The method of claim 1, wherein the at least one external electronic device comprises external electronic devices capable of outputting data related to the electronic device.

3. The method of claim 1, further comprising:
   performing an operation corresponding to data received from the at least one external electronic device according to the transmitted notification information.

4. The method of claim 3, wherein the performing of the operation comprises:
   performing an operation corresponding to an average value of the data received from the at least one external electronic device.

5. A method for notifying an external electronic device connected with an electronic device, the method comprising:
   receiving, if at least one external electronic device is connected with the electronic device, a signal from the at least one external electronic device;
   determining whether the at least one external electronic device is being worn or not being worn based on the received signal;
   identifying whether there is notification information to be transmitted to the at least one external electronic device; and
   transmitting, if the at least one external electronic device is being worn, the notification information to the at least one external electronic device being worn,
   wherein the determining of whether the at least one external electronic device is being worn or not being worn comprises:
      determining whether the at least one external electronic device connected with the electronic device is capable of outputting data on types of signals to be transmitted, and
      determining, among the at least one external electronic device capable of outputting the data, external electronic devices not being worn.

6. The method of claim 1, wherein the signal from the at least one external electronic device comprises a signal detected by a proximity sensor of the at least one external electronic device.

7. A method for notifying an external electronic device connected with an electronic device, the method comprising:
   receiving, if at least one external electronic device is connected with the electronic device, a signal from the at least one external electronic device;
   determining whether the at least one external electronic device is being worn or not being worn based on the received signal;
   identifying whether there is notification information to be transmitted to the at least one external electronic device; and
   transmitting, if the at least one external electronic device is being worn, the notification information to the at least one external electronic device being worn,
   wherein the transmitting of the notification information comprises:
      determining whether the at least one external electronic device being worn is capable of outputting data on types of signals to be transmitted, and
      transmitting, the notification information to the external electronic device capable of outputting the data.

8. A method for notifying an external electronic device connected with an electronic device, the method comprising:
   receiving, if at least one external electronic device is connected with the electronic device, a signal from the at least one external electronic device;
   determining whether the at least one external electronic device is being worn or not being worn based on the received signal;
   identifying whether there is notification information to be transmitted to the at least one external electronic device; and
   transmitting, if the at least one external electronic device is being worn, the notification information to the at least one external electronic device being worn,
   wherein the transmitting of the notification information comprises:
      receiving sensor values of other electronic devices except for the external electronic devices not being worn,
      selecting an external electronic device having a smallest sensor value among the received sensor values, and
      transmitting the notification information to the selected external electronic device.

9. A method for notifying an external electronic device connected with an electronic device, the method comprising:
   receiving, if at least one external electronic device is connected with the electronic device, a signal from the at least one external electronic device;

determining whether the at least one external electronic device is being worn or not being worn based on the received signal;
identifying whether there is notification information to be transmitted to the at least one external electronic device; and
transmitting, if the at least one external electronic device is being worn, the notification information to the at least one external electronic device being worn,
wherein the transmitting of the notification information comprises:
selecting an external electronic device that can output data corresponding to types of signals to be transmitted among other electronic devices except for the external electronic devices not being worn, and
transmitting the notification information to the selected external electronic device.

10. An electronic device comprising:
a transceiver configured to communicate with at least one external electronic device; and
at least one processor configured to:
  receive, if the at least one external electronic device is connected with the electronic device, a signal from the at least one external electronic device,
  determine whether the at least one external electronic device is being worn or not being worn based on the received signal,
  identify whether there is notification information to be transmitted to the at least one external electronic device,
  determine whether the at least one external electronic device connected with the electronic device uses a same account as that of the electronic device,
  transmit the notification information to a first external electronic device selected from the at least one external electronic device in a case that the first external electronic device uses the same account as the electronic device and the first external electronic device is being worn, and
  transmit the notification information to a second external electronic device selected from the at least one external electronic device in a case that the first external electronic device does not use the same account as the electronic device or the first external electronic device is not being worn.

11. The electronic device of claim 10, wherein the at least one external electronic device comprises external electronic devices capable of outputting data related to the electronic device.

12. The electronic device of claim 10, wherein the signal from the at least one external electronic device comprises a signal detected by a proximity sensor of the at least one external electronic device.

13. The electronic device of claim 10, wherein the at least one processor is further configured to perform an operation corresponding to data received from the at least one external electronic device according to the transmitted notification information.

14. The electronic device of claim 13, wherein the at least one processor is further configured to perform an operation corresponding to an average value of the data received from the at least one external electronic device.

15. An electronic device comprising:
a transceiver configured to communicate with at least one external electronic device; and
at least one processor configured to:
  receive, if the at least one external electronic device is connected with the electronic device, a signal from the at least one external electronic device,
  determine whether the at least one external electronic device is being worn or not being worn based on the received signal,
  identify whether there is notification information to be transmitted to the at least one external electronic device,
  transmit, if the at least one external electronic device is being worn, the notification information to the at least one external electronic device being worn,
  determine whether the at least one external electronic device connected with the electronic device is capable of outputting data on types of signals to be transmitted, and
  determine, among the at least one external electronic device capable of outputting the data, external electronic devices not being worn.

16. An electronic device comprising:
a transceiver configured to communicate with at least one external electronic device; and
at least one processor configured to:
  receive, if the at least one external electronic device is connected with the electronic device, a signal from the at least one external electronic device,
  determine whether the at least one external electronic device is being worn or not being worn based on the received signal,
  identify whether there is notification information to be transmitted to the at least one external electronic device,
  transmit, if the at least one external electronic device is being worn, the notification information to the at least one external electronic device being worn,
  determine whether the at least one external electronic device being worn are capable of outputting data on types of signals to be transmitted, and
  transmit, the notification information to the external electronic device capable of outputting the data.

17. An electronic device comprising:
a transceiver configured to communicate with at least one external electronic device; and
at least one processor configured to:
  receive, if the at least one external electronic device is connected with the electronic device, a signal from the at least one external electronic device,
  determine whether the at least one external electronic device is being worn or not being worn based on the received signal,
  identify whether there is notification information to be transmitted to the at least one external electronic device,
  transmit, if the at least one external electronic device is being worn, the notification information to the at least one external electronic device being worn,
  receive sensor values of other electronic devices except for the external electronic devices not being worn,
  select an external electronic device having a smallest sensor value among the received sensor values, and
  transmit the notification information to the selected external electronic device.

18. An electronic device comprising:
a transceiver configured to communicate with at least one external electronic device; and at least one processor configured to:
- receive, if the at least one external electronic device is connected with the electronic device, a signal from the at least one external electronic device,
- determine whether the at least one external electronic device is being worn or not being worn based on the received signal,
- identify whether there is notification information to be transmitted to the at least one external electronic device,
- transmit, if the at least one external electronic device is being worn, the notification information to the at least one external electronic device being worn,
- select an external electronic device that can output data corresponding to types of signals to be transmitted among other electronic devices except for the external electronic devices not being worn, and
- transmit the notification information to the selected external electronic device.

* * * * *